Patented Oct. 9, 1945

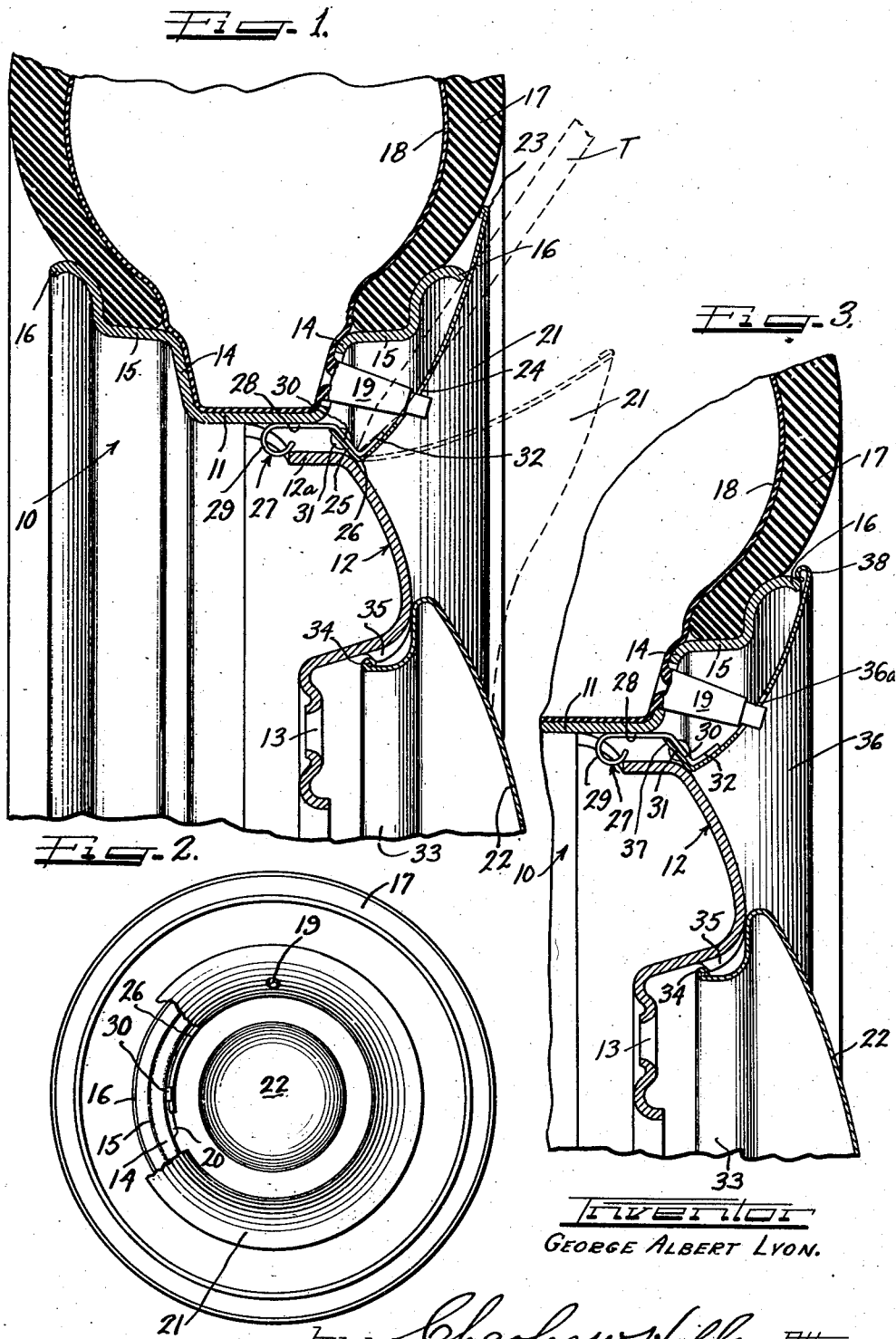

2,386,228

UNITED STATES PATENT OFFICE 2,386,228

WHEEL STRUCTURE

George Albert Lyon, Allenhurst, N. J.

Application April 5, 1943, Serial No. 481,807

3 Claims. (Cl. 301—37)

This invention is directed to an improved wheel structure and relates more particularly to an improved wheel cover assembly therefor.

It is an important object of the present invention to provide for a wheel structure, a cover assembly embodying an improved retaining arrangement whereby the cover assembly is efficiently secured to the wheel structure in an improved manner.

Still another object of the invention is to provide for a wheel structure a wheel cover which is so arranged that the part thereof which is retainingly engaged against the wheel is substantially reinforced thus to augment the security of the atttachment thereof to the wheel structure.

Another object of the invention is to provide for a wheel structure, a cover arrangement whereby apertures in the wheel structure to which the cover is secured are effectively protected against the passage of stones, dirt and other foreign matter therethrough.

In accordance with the general features of the invention there is provided herein, for a wheel structure, a novel cover arrangement including a cover portion in the form of an annulus, said annulus having resilient, locally flexible characteristics such as possessed by sheet material formed from synthetic plastic, rubber, either natural or synthetic, or a thin springy metal.

With a cover member having the foregoing characteristics it is now feasible to provide the same with a cross-sectional configuration of such shape and magnitude that it may be arranged to extend over the outer side of a tire rim of the wheel structure to which it is attached thereby to conceal the same and to house, with the outer side of the tire rim, appurtenances such as the tire valve stem, wheel balancing weights, or the like, which are associated with the tire rim, these parts being available for servicing without necessitating removal of the cover member since the latter is locally distortible or flexible to render the rear side thereof accessible. Furthermore, the cover member may extend over the outer side of the tire rim and radially inwardly over a portion of the body part of the wheel structure thereby to constitute in effect a continuation of the side wall of a tire in the tire rim to give the appearance of being a part thereof and to constitute, in effect, a white side wall of the tire when colored white.

In accordance with other general features of the invention there is provided herein a tire cover which may, if desired, be arranged to extend radially outwardly of the edge portion of the tire rim thus to overlie the outer side wall of a tire in the tire rim and which, because of the aforementioned characteristics, may breathe or flex axially outwardly in response to axially outward expansion of the side wall of the tire under load bearing conditions and which, when annular in form, may be provided at the inner peripheral part thereof with a V-like cross-sectional configuration whereby the inner peripheral part is strongly reinforced to augment the secure attachment thereof to the wheel structure, this attachment being completed by the provision of clips, or the like, shaped in part to conform to the configuration of the inner peripheral portion of the cover member and having a portion arranged for snap-on pry-off engagement in circumferentially spaced apertures formed in the wheel structure.

Still another object of the invention is to provide for a wheel structure, a novel cover assembly so arranged as to lend itself admirably to ready removal from the wheel structure to which it is attached by the use of any readily available implement such as a screw driver or the like, the retaining means being so configurated and so associated with the cover member that the latter is protected from damage during this removal operation.

It is a more specific object of the invention to provide for a cover assembly, retaining means arranged for snap-on pry-off engagement with a wheel structure, said retaining means being formed at substantially the axially outer part thereof to provide a reinforcing part which aids in the retention of a wheel cover upon the wheel assembly and at the same time provides a reinforced pry-off surface which may be engaged by the pry-off implement to protect the relatively frangible cover member formed from a sheet material such as synthetic plastic or the like, from damage.

Many other objects and advantages of the invention will become apparent from the following description and accompanying drawing in which:

Figure 1 is a fragmentary cross-sectional view of a wheel structure embodying one form of my invention;

Figure 2 is a side elevation of the construction shown in Figure 1, parts being broken away for illustrative purposes; and Figure 3 is a fragmentary cross-sectional view of a wheel structure embodying a modified form of my invention.

It will be understood that the modifications shown herein are for illustrative purposes only and may be changed or modified without departing from the spirit and scope of the invention as set forth in the appended claims.

As shown in Figure 1 the reference character 10 designates generally a multi-flange, drop center type of tire rim which is connected as by riveting or welding or the like through a base flange 11 to a central body part or spider 12 which includes a central bolt-on flange 13. The drop center rim 10 is further provided with opposite side flanges 14, opposite intermediate flanges 15 and opposite edge portions 16. A suitable tire 17 having an inner tube 18 and a valve stem 19 is mounted upon the rim, one of the side walls 14 having an orifice through which the valve stem 19 may project. The spider 12 is provided with a radially outer flange 12a which, as shown more clearly in Figure 2, has portions formed to be spaced from the inner surface of the flange 11 to provide spaced apertures 20 in the wheel structure.

The embodiment of the invention shown in Figure 1 includes a cover assembly comprising an outer annulus 21 and a central hub cap portion 22. The cover part 21, as indicated previously, may be constructed from a resiliently flexible sheet material such as synthetic plastic, rubber, either synthetic or natural, or some other substance having resiliently flexible characteristics whereby the cover portion 21 may be flexed locally away from the rim 10 as shown in dotted lines in Figure 1 to afford access to the tire valve stem 19 or wheel weights which may be attached to the tire rim. Furthermore, as shown in Figure 1, the axially outward flexure of the annulus 21, as shown in dotted lines, affords admission of a tool T for removal of the same, the operation of which will be described presently.

With a cover portion so constructed it is now feasible to provide the cover with a cross-sectional configuration of such curvature and magnitude that it entirely conceals the outer part of the tire rim and the appurtenances such as the tire valve and wheel weights which are associated therewith. As shown on the drawing, in order that the above concealment may be accomplished, the cover portion 21 is so constructed that the outer periphery thereof extends from the side wall of the tire 17 radially inwardly to a part of the wheel spider 12. With such a construction it will be seen that the cover member 21, instead of presenting a sharp axially inward curve from the outer periphery thereof, presents a gradual curve which gives the effect of a continuation of the side wall of the tire and thus the appearance of being a part thereof, whereby, if it is colored white, it gives the appearance of being a white side wall of the tire. Furthermore, the cover member 21, since it extends radially outwardly beyond the edge portion 16 of the tire rim, effectively conceals the junction between the tire rim and tire as well as the outer portion of the tire rim and the appurtenances associated therewith.

Another advantage of a wheel cover constructed to possess the aforementioned configuration and characteristics is that when the tire 17 assumes a laterally expanded condition as when a load is impressed thereon, the outer peripheral edge of the cover member 21 flexes locally to follow this expanding movement of the tire and immediately recedes to the position shown in Figure 1 as the tire revolves and assumes its normal cross-sectional configuration when the load is relieved therefrom during rotation.

As indicated previously, the tire cover is preferably formed from a relatively frangible material such as synthetic plastic or some other elastically, resiliently, flexible material and consequently this factor must be taken into consideration in providing retaining means for maintaining the cover upon the wheel structure, in order that maximum protection may be afforded for the cover member during flexure and during the removal thereof from the wheel structure when this is necessary.

To this end the cover member 21 which may be reinforced at its outer peripheral edge by turning the peripheral margin thereof back against its inner surface, as shown at 23, and which may be provided with an orifice 24 through which the valve stem 19 may protrude, is formed at its inner peripheral margin with a cross-sectionally substantially V-shaped configuration. This configuration affords an annular, axially inwardly, radially outwardly, disposed peripheral flange 25, the junction 26 thereof with the body member serving as a supporting abutment for the inner peripheral part of the cover member against the adjacent portion of the outer surface of the body part 12 of the wheel structure. In this manner it will be seen that the cover member 21 is securely bottomed at the inner peripheral edge thereof against a part of the outer surface of the body part 12 of the wheel structure, the abutment thereof being at a part of the surface disposed considerably radially inwardly of the junction between the flange 12a of the body part 12 and the base flange 11 of the tire rim 10.

It will also be noted that the aforementioned substantially V-shaped configuration of the inner peripheral part of the cover member 21 affords considerable strengthening of the cover member in its attachment to the wheel structure In order that the cover member 21 may be securely attached to the wheel structure, there are provided herein retaining members 27 which may be secured to the wheel structure in any appropriate manner but in the present instance are provided with substantially axially inwardly extending arms 28 having curled inner terminal parts 29, the parts 29 having a radial dimension greater than the radial distance between the radially inner surface of the base flange 11 and the radially outer surface of the flange 12a. The retaining members 27 are formed from a resilient material whereby the terminal ends 29 thereof may be compressed to allow passage through the circumferentially spaced apertures in the wheel structure whereupon they expand into the position shown in Figure 1 to securely retain the cover assembly upon the wheel structure.

The axially extending arms 28 of the retaining members 27 terminate axially outwardly in a cover engaging portion having a substantially V-shaped cross-sectional configuration adapted for nested relationship against the radially outer surface of the V-shaped portion of the cover member 21. As will be seen from Figure 1 the last named part of the retaining means 27 includes an arm 30 to which the radially inner peripheral margin of the cover member 21 may be secured as by rivets 31 or in any other suitable manner. The arms 30 terminate in obliquely disposed, radially outwardly, axially outwardly extending arms 32 arranged to be disposed in surface abutment against the adjacent portion of the rear surface of the cover member 21 to reinforce the same. It will be understood that the retaining members or clips 27 may be so circumferentially arranged that they may be aligned with the circumferentially spaced apertures 20 at the junction of the tire rim 10 in the body part 12 of the wheel structure, thereby to register with the same during application of the cover member 21 by axial inward movement thereof against the wheel structure.

After the cover assembly has been secured to the wheel in the manner above described, it will be seen from the dotted line position of the cover member in Figure 1 that flexure thereof takes place at the apex or junction 26 in the V-shaped portion and thus flexing movement, in effect, is provided by hinge-like action around the portion of the cover which is supportingly engaged by the outer surface of the body part 12 of the wheel structure.

Another important aspect of the invention residing in the construction, shown in Figure 1, is that the peripheral flange 25 thereof is disposed substantially over the apertures in the wheel structure thus preventing ingress of stones or the like which would become entrapped at the rear of the cover member to injure the same during rotation of the wheel.

An important aspect of the retaining assembly provided herein is the protection afforded to the relatively frangible cover member 21 during a pry-off operation by the tool T. As will be seen from Figure 1, removal of the cover member is accomplished by flexing the same radially outwardly to the dotted line position shown, whereupon the pry-off tool T may be disposed with the end thereof in surface engagement with the substantially axially inner surface of the member 32 of the retaining means. An intermediate part of the tool is engaged against the edge portion 16 of the tire rim to provide a fulcrum whereupon the handle of the tool (not shown) may be raised to cause the end thereof to press against the part 32 of the retaining member to urge the cover assembly with the retaining means therefor axially outwardly of the wheel structure.

From the foregoing it will be seen that the terminal portion 32 of the retaining means protects the adjacent portion of the cover member from damage during the pry-off operation while the cover member is further prevented from destruction during use by the extension of the flange 25 thereof over the circumferentially spaced apertures in the wheel structure to prevent the ingress of stones or the like.

The cover arrangement for the wheel structure, as indicated above, is completed by the attachment of the central hub cap simulating portion 22 which is provided with an axially inwardly extending snap-on flange 33 terminating in a snap-on bead 34 which is adapted to be urged resiliently over bumps 35 formed in the outer surface of the body part 12 of the wheel structure, the bead 34 being arranged to be seated upon an axially inwardly extending face on the respective bumps 35 to secure the cover part 22 on the wheel structure in snap-on pry-off relationship.

In the construction shown in Figure 3 the retaining members 27 are identical to those described in connection with Figure 1. In this construction the annular cover member 36 is provided at its inner peripheral margin with the substantially V-shaped cross-sectional configuration and the obliquely disposed, radially outwardly, axially inwardly, extending inner peripheral flange 37 similar to that described in connection with the construction of Figure 1. The cover member 36 is likewise provided with an orifice 36a through which the valve stem 19 may be accessible and differs from the annular cover member 21 of Figure 1 merely in that the outer peripheral edge thereof is curled as at 38 and extends up to and slightly radially outwardly of the edge portion 16 of the tire rim whereby the curled, reinforced edge 38 overlies the edge of the edge portion 16 in cam engagement therewith to augment the attached relationship of the cover member to the wheel structure.

The attributes and functions of the retaining means in the constructions of Figure 3 are, of course, the same as those described in conjunction with Figure 1 of the drawing.

It will thus be seen that there is provided herein a novel cover member which is so cross-sectionally configurated and arranged that the circumferentially spaced apertures of the wheel structure are covered to prevent the ingress of stones and gravel which would become entrapped behind the cover member and thus would mar or destroy the same during rotation of the wheel and would additionally afford vibration and rattling to detrimentally effect the entire purpose and function of the cover member. It will further be seen that there is provided herein a novel attachment arrangement whereby removal of the cover member with the retaining means may be accomplished without the necessity of destructive engagement between the pry-off tool and the cover member proper, the latter being protected by an overlying portion of the retaining means.

Additionally it will be seen that there is provided herein an annular cover member having the inner peripheral margin thereof so arranged and configurated that it is disposed in abutting, supporting engagement with a radially inner portion of the outer surface of the body part of the wheel structure, this peripheral portion of the cover member being also configurated to afford inherent strength in the cover member at the part thereof which is engaged by retaining means.

It will be understood that while the present invention has been described in conjunction with retaining means arranged to cooperate with circumferentially spaced apertures in the wheel structure, any one of many other expedients may be utilized for securing the retaining means to the wheel structure.

What I claim is:

1. In a wheel structure including a tire rim and a body part, there being circumferentially spaced apertures at the junction of said rim and body part, an annular cover member arranged for disposition over the outer side of the wheel structure and over the tire rim to conceal the same, said cover member including an inner peripheral marginal portion disposed to provide, with the remainder of the cover member, a cross-sectionally V-shaped, reinforcing inner peripheral margin, retaining means for securing said cover member in concentric relationship to and over the outer side of the wheel structure, said retaining means including a plurality of resilient clips arranged for alignment with the apertures and having portions engageable therein for retaining the cover member over the outer side of the wheel structure, said retaining means having the axially outer ends thereof formed to provide cross-sectionally V-shaped parts for disposition in nested relationship with the V-shaped part of the cover member.

2. In a cover structure for a wheel including a flanged rim part carrying a tire and a body part joined thereto at spaced intervals leaving wheel openings therebetween, an annular cover member of resilient material deflectable without permanent distortion, said member extending radially and axially inwardly over the outer exposed side flange of the rim member to substantially conceal the same and having its inner margin turned generally rearwardly into an angular flange opposite the wheel openings, and retaining means comprising spring clips detachably mounted in said openings each having an outer extension secured to said flange, said angular flange being seated on said body at said wheel openings and held tightly thereagainst by said spring clips.

3. The structure of claim 2 further characterized by said cover member being of outwardly bowed cross-sectional configuration and of such curvature as to appear in use to constitute an extension of the side wall of the tire, so that said tire appears to extend clear to said flange.

GEORGE ALBERT LYON.